United States Patent
Bech et al.

(10) Patent No.: US 6,773,259 B1
(45) Date of Patent: Aug. 10, 2004

(54) CONTINUOUS SOLID WASTE DERIVED FUEL FEED SYSTEM FOR CALCINER KILNS

(75) Inventors: Claus Bech, North Charleston, SC (US); Charles R. Murray, Jr., St. George, SC (US)

(73) Assignee: Giant Cement Holding Inc., Summerville, SC (US)

( * ) Notice: Subject to any disclaimer, the term of this patent is extended or adjusted under 35 U.S.C. 154(b) by 0 days.

(21) Appl. No.: 10/634,726

(22) Filed: Aug. 5, 2003

(51) Int. Cl.$^7$ ............................................. F27B 15/00
(52) U.S. Cl. ........................................ 432/14; 432/58
(58) Field of Search ............................ 432/14, 58, 106; 110/245, 346; 106/100, 700, 701, 703, 709

(56) References Cited

U.S. PATENT DOCUMENTS

| | | | |
|---|---|---|---|
| 4,295,823 A | 10/1981 | Ogawaa et al. |
| 4,466,361 A | 8/1984 | Henery et al. |
| 4,645,452 A | 2/1987 | Henin et al. |
| 4,708,644 A | * 11/1987 | Lawall et al. ............... 432/106 |
| 4,850,290 A | 7/1989 | Benoit et al. |
| 4,930,965 A | 6/1990 | Peterson et al. |
| 4,969,407 A | 11/1990 | Benoit et al. |
| 4,974,529 A | 12/1990 | Benoit et al. |
| 5,058,513 A | 10/1991 | Benoit et al. |
| 5,078,594 A | 1/1992 | Tutt et al. |
| 5,083,516 A | 1/1992 | Benoit et al. |
| 5,086,716 A | 2/1992 | Lafser, Jr. |
| 5,156,676 A | 10/1992 | Garrett et al. |
| 5,224,433 A | 7/1993 | Benoit et al. |
| 5,226,774 A | 7/1993 | Tutt et al. |
| 5,269,234 A | 12/1993 | Powell |
| 5,339,751 A | 8/1994 | Tutt |
| 5,349,910 A | 9/1994 | Hundebol |
| 5,377,603 A | 1/1995 | Reese et al. |
| 5,388,537 A | 2/1995 | Larson et al. |
| 5,454,715 A | 10/1995 | Hansen et al. |
| 5,530,176 A | 6/1996 | Brady |
| 5,549,058 A | 8/1996 | Tutt |
| 5,555,823 A | 9/1996 | Davenport |
| 5,816,795 A | 10/1998 | Hansen et al. |
| 5,975,891 A | * 11/1999 | Hundebøl ..................... 432/14 |
| 6,050,203 A | 4/2000 | Reese et al. |
| 6,345,981 B1 | 2/2002 | Hansen et al. |
| 6,470,812 B1 | 10/2002 | Arroyave-Garcia et al. |
| 6,601,541 B2 * | 8/2003 | Burdis et al. ............... 122/4 D |

FOREIGN PATENT DOCUMENTS

EP   0 582 394 A1   2/1994

* cited by examiner

Primary Examiner—Gregory Wilson
(74) Attorney, Agent, or Firm—McNair Law Firm, PA; Cort Flint (57) ABSTRACT

A system is disclosed for continuously feeding and burning solid waste derived fuel (SWDF) material in the calciner of a calciner kiln comprising a calciner combustion chamber, a kiln feed for feeding raw kiln material to the calciner combustion chamber, and a waste material feed system for continuously feeding SWDF material at a controlled rate to the calcine combustion chamber for burning. A burner having a burner fuel control for feeding a control fuel to the burner to control the temperature in the calciner combustion chamber. A riser duct is connected between a charge end of the rotary kiln and the calciner. The combustion chamber introduces hot combustion gas generally above the riser duct for mixing with the hot kiln gas flowing through the riser duct at a high velocity for further calcining of the raw kiln materials and burnout of the SWDF material.

49 Claims, 6 Drawing Sheets

CONTINUOUS SOLID WASTE DERIVED FUEL FEED SYSTEM FOR CALCINER KILNS

BACKGROUND OF THE INVENTION

The invention relates to cement kilns and more particularly a system for feeding waste derived fuel to a calciner kiln in a continuous manner during the manufacturing of cement.

Cement kilns are massive cylindrical structures, lined with refractory brick, into which a lime-bearing material and fuel such as coal or gas is fed. There is a range of different kiln designs but all rely on the same basic processes—raw feed material passing through the kiln is heated to very high temperatures by the burning of fuel and is transformed chemically and physically into a grey pebble-like material called clinker. Clinker is ground to produce cement. The three broad processes of cement manufacturing are: (1) raw milling, the preparation of the kiln feed material; (2) calcining and burning or clinkering, the material conversion process that takes place within the cement kiln and associated equipment; and (3) finish milling, the grinding of clinker to produce cement with the addition of gypsum.

The main raw material for the manufacture of clinker is a lime-bearing material. Ideally, this material is mined or dredged from a location near the plant to minimize transport and handling costs. Limestone is the most common material used, although other calcareous material (calcium carbonate) can be used. A large percentage, by weight, of the lime-bearing material is lost as carbon dioxide in the manufacturing process. Raw materials are combined to form a raw mix, and the proportions are governed by the chemical properties of the materials to be used and the desired properties of the clinker that is produced. The raw materials for a dry process kiln are mixed to produce an aerated dry raw material.

There are four stages to the process of the burning of the raw mix in a calciner kiln to form clinker; evaporation and preheating, calcining, clinkering and cooling. Evaporation and preheating remove moisture and raise the temperature of the raw mix preparatory to calcining. Calcining takes place at 800–900 C (gas temperature) and breaks the calcium carbonate down into calcium oxide and carbon dioxide which is evolved in the process. Clinkering completes the calcination stage and fuses the calcined raw mix into hard nodules resembling small grey pebbles. Kiln temperatures in the burning zone range from 1350–1450 C (material temperature). Retention times in the calciner range from 4 to 6 seconds. Retention times in the kiln is approximately 20 minutes.

Clinkering is critical to the quality of cement and requires accurate control of the energy input. Insufficient heat will cause the clinker to be underburnt, containing unconverted lime, and reducing the hydration (setting and hardening) properties of the resulting cement. Excess heat will shorten the life of the refractory bricks lining the kiln, may damage the kiln shell and diminish product reactivity. The high temperatures required for burning of the raw mix mean that the process is energy intensive. Electrical energy is required for the raw milling and mixing, burning, and finish milling. The largest energy demand is for fuel for burning of the raw mix. This has been the focus of technological developments, and the need to reduce energy in the cement manufacturing process remains a problem.

Rotary kilns are large steel tubes typically over 50 meters in length and up to 7 meters in diameter. They are slightly inclined to the horizontal and are slowly rotated at about 1 to 4 revolutions per minute. Raw mix is fed into the kiln at the back (the upper end of the kiln), and gravity and the rotation of the kiln allows the mix to flow down the kiln at a uniform rate through the burning zone. Clinker is formed in the burning zone and flows out of the front of the kiln (the lower end of the kiln) where it is cooled by blowing air through the clinker bed, and the heated air is used for combustion. The primary fuel is introduced and burnt at the front of the kiln. The flame is drawn up the kiln to the burning zone where the heat intensity is highest and fusion of chemicals in the raw mix takes place. Hot combustion gases continue to flow up the kiln and exit from the back end. Opportunities for recovering heat from kiln exhaust gases have made incremental improvements in lowering the energy demand of the kiln.

Suspension preheaters comprising a series of vertically aligned cyclones attached to the back end of the kiln have been advanced to reduce energy requirements in calciner kilns. Hot kiln exhaust gases flow up through the cyclones, and the raw mix is fed in at the top of the cyclones. As the raw mix travels down through the cyclones, it is heated by the exhaust gases, preheating the mix and initiating calcination.

The cement manufacturing process is carried out in wet kilns or calciner kilns using a rotary kiln. The calciner kiln process is carried out in a kiln that is commonly referred to as a calciner kiln. Both the wet kiln and the calciner kiln have utilized waste materials in order to reduce energy demands. In the wet kiln process, both liquid and solid waste materials have been introduced in various ways at the burner end of the kiln. Typically the liquid hazardous waste is injected into the burner by way of a nozzle. The hazardous solid waste materials are typically pneumatically fed into the burner end of the kiln. In the calciner kiln, liquid waste fuels are burned by introducing the liquid waste fuel mainly by injecting the fuel through a nozzle into the calciner or the kiln. One process for burning solid waste material is the hot disk process where solid waste fuel is placed on a rotating disk and combusted, and the ashes are removed while the disk rotates. The air passing through the hot disk is drawn into the calciner for heat and further combustion. Another process is a gasifier process, which is basically a pyrolysis process, where the solid waste material is roasted to evaporate the volatile ingredients which are then combusted in the calciner. There is also a batch process using calciner kilns where packages or containers of solid waste fuel are delivered to the feed shelf and combusted in the kiln. The batch process is generally not cost efficient because the waste material has to be processed into the containers which adds an additional cost to the process and the containers are combusted in a intermittent manner rather than a continuous manner.

U.S. Pat. No. 6,470,812 B1 discloses a method and apparatus for recovering energy from solid wastes by burning in the tertiary air duct of a calciner kiln. The patent includes a good discussion of prior patented inventions relating to reducing energy demands of cement kilns by burning solid wastes.

Another recent patent, U.S. Pat. No. 6,345,981 B1 discloses a ram feed for feeding solid wastes directly into the riser duct of a calciner kiln. U.S. Pat. No. 5,555,823 discloses an auger feed for feeding solid wastes directly into the calcining zone of a preheater kiln. U.S. Pat. No. 5,349,910 discloses a decomposition chamber for incinerating solid wastes using heat from preheated or calcined raw meal.

While advances have been made in reducing the energy demands and burning solid waste materials in calciner kilns, considerable attention still needs to be given to improving complete burnout of solid waste fuels with minimal residuals and recovering more of the heat of combustion.

Accordingly, an object of the present invention is to provide a system for feeding solid waste derived fuel (SWDF) material to a calciner in a consistent manner to provide kiln stability and more efficient operation.

Another object of the invention is to provide a system and method for feeding (SWDF) material to the calciner of a calciner kiln wherein the feeding of the material is continuous and, therefore, consistently provided to the combustion process.

Another object of the present invention is to provide a more stable calciner kiln process wherein (SWDF) materials are metered and delivered in consistent blends in a continuous manner during the calcination and kiln process.

Another object of the invention is to provide a feed system for feeding shredded SWDF material, either in loose bulk or containerized form, directly into the calciner along with raw kiln meal where the SWDF is burned with other fuels such as oil, gas, coal, petroleum coke, and liquid waste derived fuel during calcination.

SUMMARY OF THE INVENTION

The above objectives are accomplished according to the invention by providing a continuous feed system for feeding SWDF material directly to a calciner along with raw kiln material where the SWDF material is burned and the kiln material is calcinated at a controlled temperature in a high oxygen atmosphere.

The calciner kiln, for producing cement from raw kiln material, includes a preheater having a plurality of cyclone stages for heating the raw kiln material, and a calciner having a calciner combustion chamber and a calciner duct for calcining the raw kiln material. A rotary cement kiln has a charge end and a discharge end for producing clinker from the calcined raw kiln material. A riser duct is disposed between an in-line duct of the calciner duct and the charge end of the rotary kiln. The riser duct and in-line calciner duct are in-line with a flow of hot kiln gas from the charge end of the rotary kiln. A raw kiln material feed supplies raw kiln material, which may be preheated, into the combustion chamber. A waste material feed system continuously feeds solid waste derived fuel (SWDF) material into the combustion chamber. The calciner combustion chamber has a controlled environment for burning the SWDF in the presence of the raw kiln material for calcining the raw kiln material. A connector duct connects the calciner combustion chamber and calciner duct for delivering the calcined kiln material, heat of combustion, and any ashes of non-combustible material to the calciner duct at an entry zone above the riser duct.

Advantageously, the combustion chamber includes a burner producing a burner flame to control the temperature in the calciner combustion chamber and burning of the SWDF material. An air inlet introduces combustion air into the combustion chamber having a high oxygen content generally equal to that of ambient, and a fuel control regulates the feed of a control fuel to the burner. The control fuel provides a more spontaneous combustion than the SWDF material to provide a more effective control over the temperature in the calciner combustion chamber. An intermediary cyclone stage collects the raw kiln material, and the raw kiln material feed supplies the raw kiln material to a feed inlet of the combustion chamber. The preheater includes a bottom separation cyclone for collecting calcined raw material and feeding the calcined raw material to the rotary kiln. Preferably, a control element splits the feed of raw kiln material between the calciner combustion chamber and vertical calciner duct, and the waste material feed system includes a feed control for feeding the SWDF material to the calciner combustion chamber at a controlled amount.

In an advantageous embodiment, the feed system for feeding SWDF material to the combustion chamber includes a feed hopper for accumulating the SWDF material, and a auger feed for feeding the SWDF material from the hopper to the combustion chamber. The auger feed includes a compression section and an expansion section wherein a compressed plug of the SWDF material is produced in the compression section and is fed to the expansion section for release into the combustion chamber in the form of loose shredded material. Preferably, a first shutoff gate is disposed between the compression section and the expansion section of the auger feed; and a second shutoff gate is disposed between the expansion section and a feed outlet of the auger feed. The shutoff gates are operable to open and close the feed of SWFD material through the auger feed. The first shutoff gate has an open position to allow feed of SWDF material through the auger feed and a closed position to block the feed of SWDF material to the expansion section. The second shutoff gate has an open position to allow feed of SWDF material to the auger feed outlet and a closed position to block the feed of SWDF material to the auger feed outlet. A controller may be provided for controlling the open and closed positions of the first and second shutoff gates. The controller positions the first and second shutoff gates in their closed positions in response to a controller input to shut down the SWDF feed system so that hot combustion gas and fire from the combustion chamber are not allowed to flow backward through the feed system. The controller operates the auger in a reverse operation prior to moving the first and second shutoff gates to the closed positions to release the compression of the compressed plug in the compression section of the auger feed. A feed conveyor feeds the SWDF material to the auger feed hopper as loose shredded material. Preferably, the conveyor includes a housing enclosing the feed conveyor; and including means for filling the enclosure with an inert gas to prevent combustion of the conveyer SWDF material. A conveyor controller controls the feed rate of SWDF material to the feed hopper so that a desired fill of SWDF material is maintained in the feed hopper. In another aspect, a fuel conditioner bin contains fuel conditioner; and a bin outlet feeds the fuel conditioner to the feed hopper of the auger feed to mix with the SWDF material enhancing the flowability of the SWDF material.

The objectives of the invention are achieved according to the invention by a method for feeding and burning solid waste derived fuel (SWDF) material during the calcination of raw cement material in the manufacture of clinker, which clinker is manufactured by a process by which raw cement material is preheated in a preheater, calcined in a calciner, burned into clinker in a rotary kiln, whereafter the clinker is eventually cooled in a cooler. More particularly, the method for feeding and burning the SWDF material during the calcining process includes; introducing the SWDF material into a combustion chamber; burning the SWDF material in the combustion chamber in a high oxygen atmosphere at a controlled temperature and fuel feed to achieve a generally complete burnout. Combustion air is fed to the combustion chamber as tertiary air from the clinker cooler. Next, the combustion gases are fed from the combustion chamber into a riser duct of the rotary kiln wherein the combustion gases mix with hot kiln gases flowing from the rotary kiln so that said hot combustion gases and hot kiln gases circulate through the calciner to complete any necessary burnout and calcination of the raw kiln material. Preferably, the method includes feeding the SWDF material to a feed hopper, and feeding the SWDF material from the feed hopper to an auger feed having a compression section and an expansion section. The SWDF material is compressed to form a compressed plug in the compression section which is released in the expansion section so that loose shredded SWDF material falls into the combustion chamber. The flow of SWDF material through said auger feed is controlled by varying the speed of the auger drive. By placing a first shutoff gate at an end of the compression section and placing a second shutoff gate near the outlet of the auger feed, the first and second shutoff gates can be closed to block the flow of hot gases and fire from the combustion chamber into the feed hopper during shut down of the combustion chamber. The compressed plug acts as an air seal so hot air does flow backwards during operation and false ambient air is not sucked into the combustion chamber.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now to the drawings, the invention will now be described in more detail.

Figure 1:
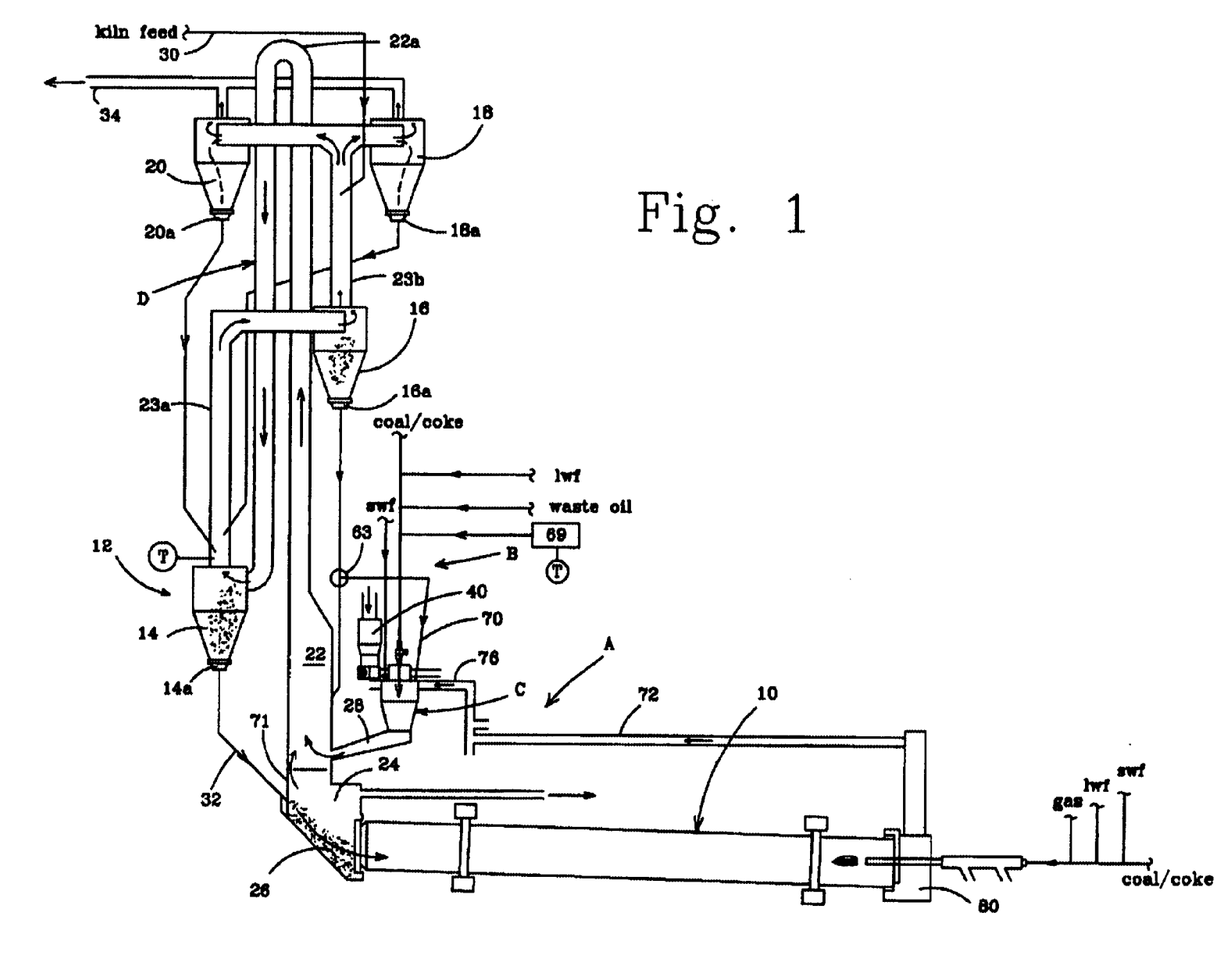
FIG. 1 is an elevation view illustrating a system and process for feeding continuous solid waste derived fuel to a calciner kiln.

As can best be seen in FIG. 1, a continuous solid waste derived fuel feed system and process for a calciner kiln, designated generally as A, is illustrated including a rotating kiln, designated generally as 10, a pre-heater, designated generally as 12, and a calciner, designated generally as B. In the illustrated embodiment, preheater 12 is illustrated as including a bottom stage cyclone 14, an intermediate stage cyclone 16, and twin upper stage cyclones 18 and 20. It is to be understood, of course, that any number of stages may be provided in the preheater, as well as the number of cyclones at each stage, depending on the dryness requirements. The 3-stage preheater is shown for purposes of illustrating the invention only, and not for limiting the invention. The preheater stages are connected in an upward flow relationship with hot gases from calciner B which includes a combustion chamber C for the calcination of raw kiln material. Calciner B further includes a calciner loop duct D which terminates at bottom cyclone 14 and includes an in-line duct 22, a duct bend 22a, and a duct 22b terminating at cyclone 14. In accordance with the invention, combustion chamber C is connected to in-line calciner duct 22 by a connector duct 28. Solid waste derived fuel (SWDF) material is fed and burned in the combustion chamber as fuel for calcining the raw kiln material. Any incomplete burnout of SWDF material or calcination of the kiln material is completed in the calciner duct D.

Preheated raw kiln meal or material at 30 is fed into preheater 12 for pre-heating and drying. The material is collected from the hot gas flow in bottom stage cyclone 14, and is fed at 32 into the rotating kiln by way of a feed shelf 18 enclosed in a smoke chamber 24. In the calcination process, hot gases rise through the calciner loop duct D and return to bottom stage cyclone 14. From cyclone 14, the hot gases flow through preheater duct sections 22b and 22c to cyclones 16, 20 and 18 where the gases exit at 34. As the hot combustion gases swirl through the preheater cyclones the raw material is entrained by the gases and heated. The raw kiln material is collected from the preheating gas flow and exits through the bottom material outlets of the cyclones at 14a, 16a, 18a, and 20a to various parts of the system. Heated raw meal from cyclones 18 and 20 is fed into preheater duct section 22b where the hot gases entrain most of the meal and carry the meal upward through intermediate stage cyclone 16 and upper stage cyclones 18, 20 where the material is collected and exits at 18a, 20a back into the preheater duct 22b. In this manner, the kiln feed meal and material is continuously preheated in the various preheater stages. In the process, a large portion of the kiln feed material is collected in lower stage cyclone 14 where it slides into the rotary kiln via feed shelf 18.

The calciner of the present invention has about twice the normal retention time as a conventional calciner. For example, a conventional calciner has about a 3 second retention time, whereas the calciner of the present invention has a retention time of about 6 seconds. This retention time is achieved by lengthening the calciner. The retention time is designed to provide a complete burnout of the fuel. This prevents release of products of incomplete combustion into the environment.

Figure 2:
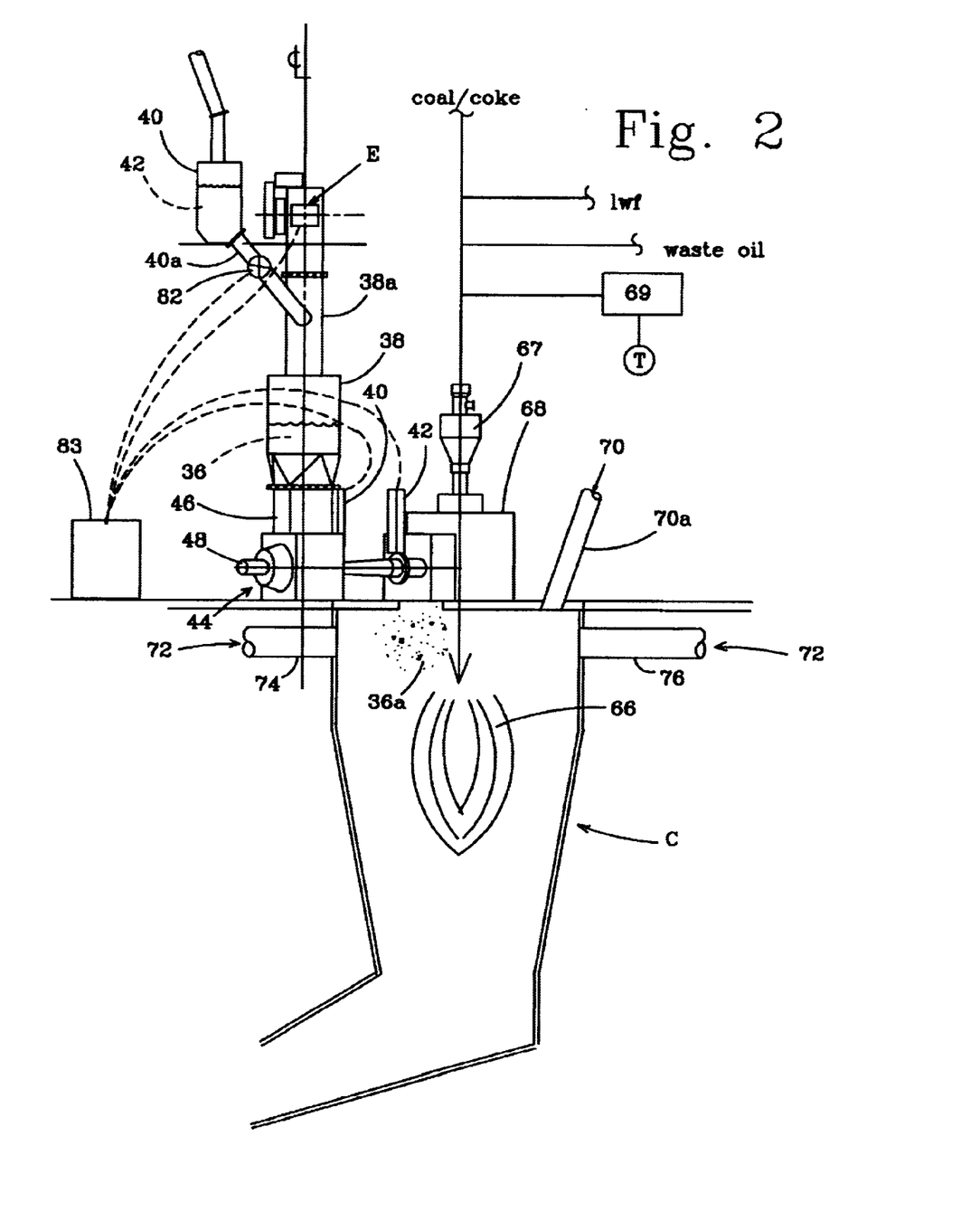
FIG. 2 is a perspective view of a solid waste derived fuel feed system and process and a combustion chamber for burning the solid waste derived fuel in a calciner section of the kiln of FIG. 1.
Figure 3:
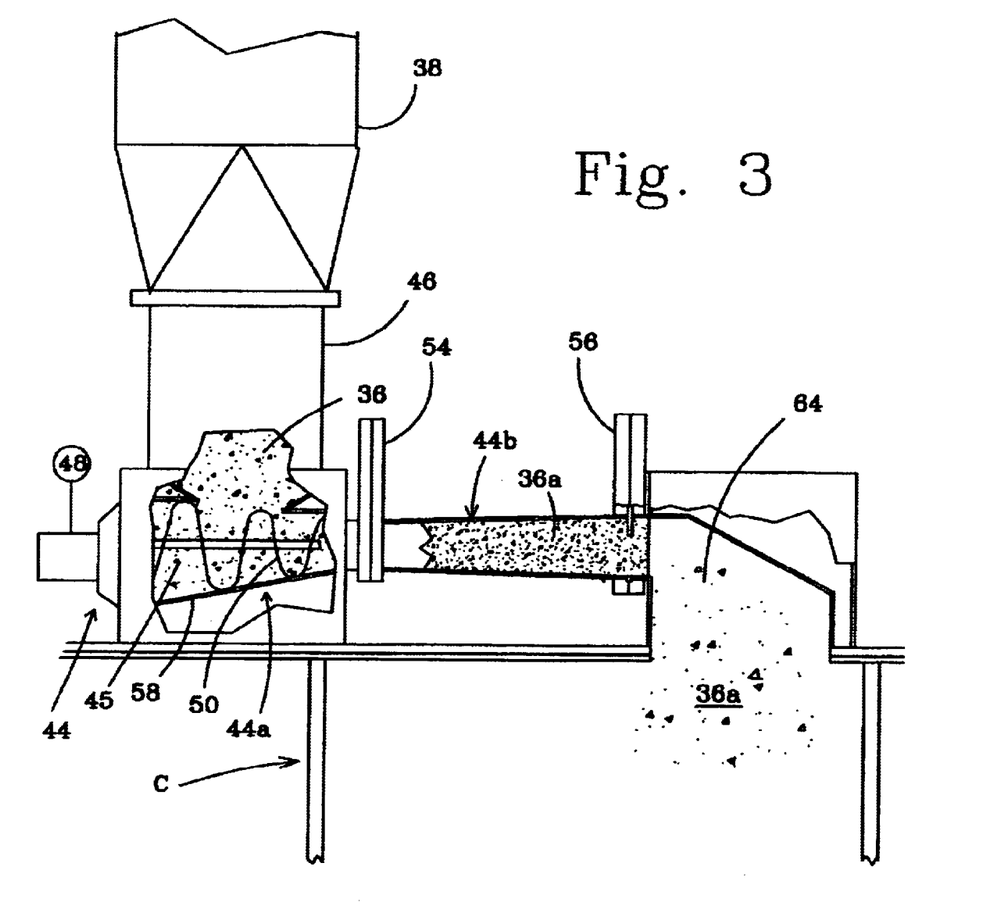
FIG. 3 is an enlarge elevation with parts cut away illustrating an auger feed system for feeding solid waste derived fuel to the combustion chamber of FIG. 2 according to the invention.
Figure 4:
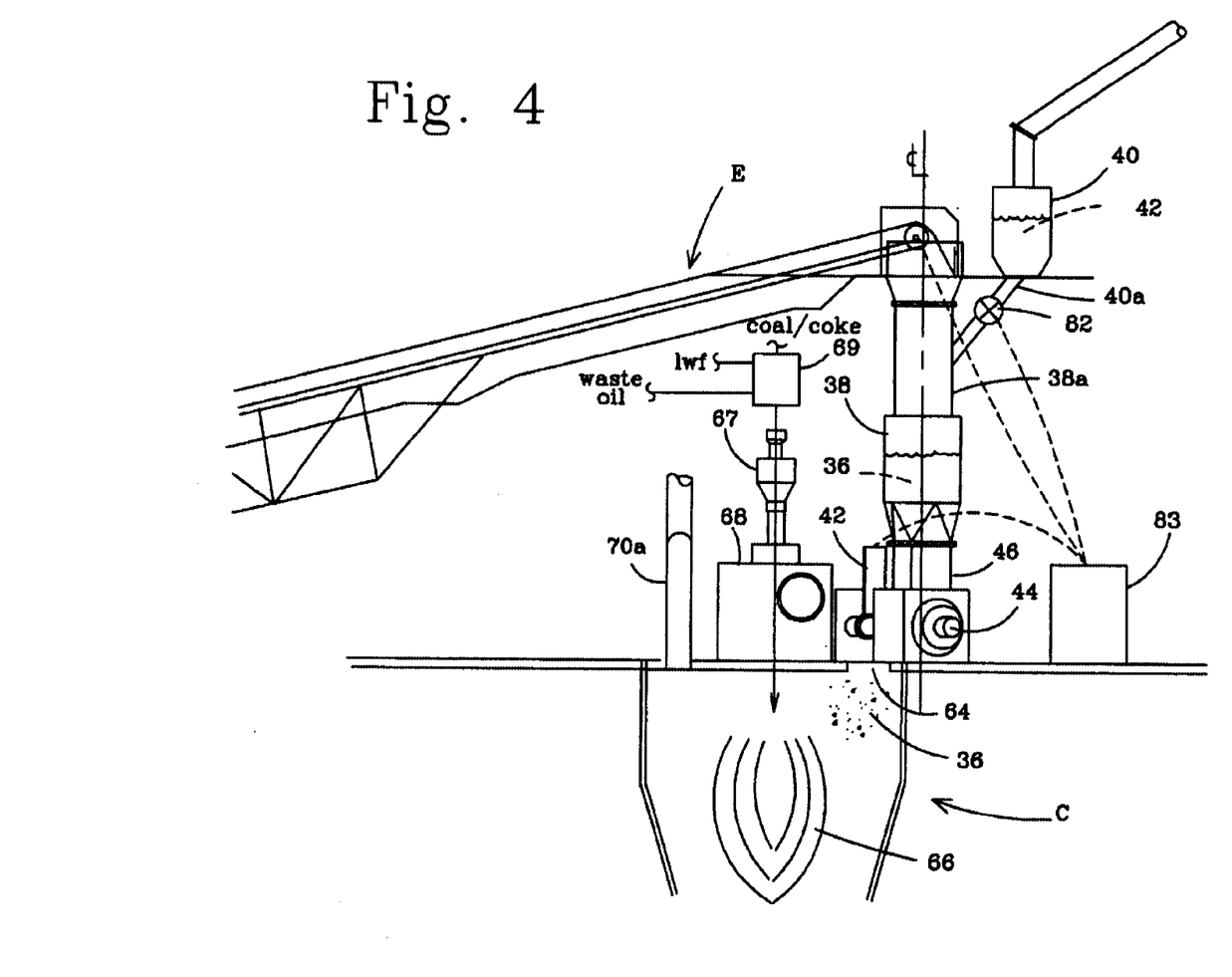
FIG. 4 is a perspective view of a conveyor system for conveying solid waste to a solid waste derived fuel system of FIG. 2.
Figure 5:
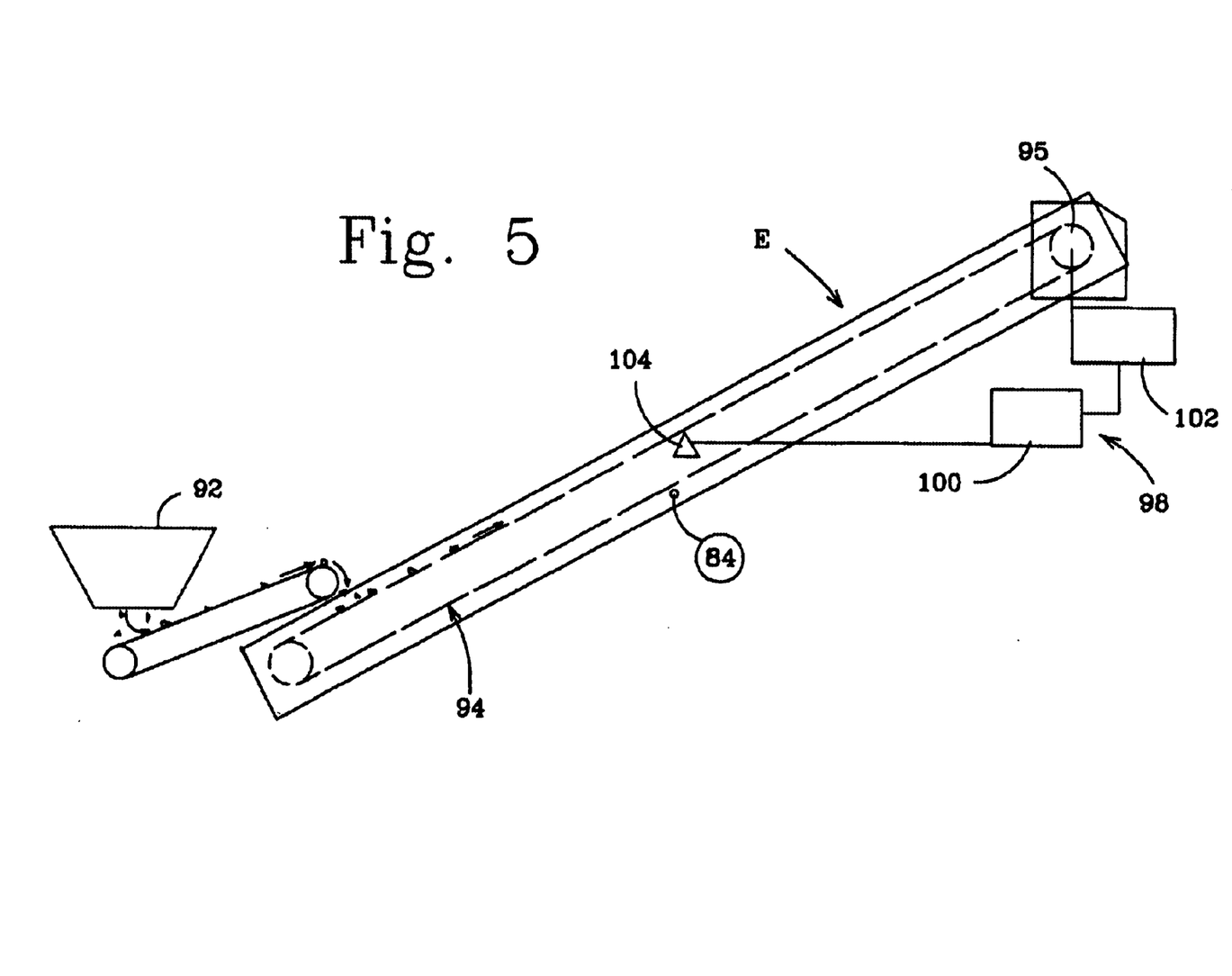
FIG. 5 is an enlarged view of a solid waste fuel conveyor system having a conveyor enclosed in an airtight housing filled with an inert gas to prevent combustion according to the invention.

Referring now in more detail to the invention, as can best be seen in FIGS. 1 and 2, calciner combustion chamber C fires the calciner duct through connector duct 28. Heat of combustion from the combustion chamber is added to hot combustion gases from kiln 10 rising through a restricted riser duct 71 into in-line calciner duct 22. The kiln gases are accelerated through the riser duct, and flow in-line with duct 22. A feed system for continuously feeding solid waste derived fuel (SWDF) material 36 to the combustion chamber includes a conveyor E for conveying the SWDF material to a feed hopper 38. The solid waste material is preconditioned by shredding. Conveyor E, as shown in FIG. 5, is a fully enclosed housing with an inert gas environment, as will be explained in more detail below. Connected to feed hopper 38 is a fuel conditioner bin 40 which contains a waste fuel conditioner 42. The waste fuel conditioner may be cement kiln dust or raw feed wherein the raw feed typically includes cement kiln dust. The waste fuel conditioner is fed through an outlet duct 40a to an inlet duct 38a of hopper 38. The fuel conditioner is blended with shredded waste fuel 36 in feed hopper 38 in order to provide flowability to the SWDF material, as well as inhibit fire in the feed system at shutdown as will be explained. The finer fuel waste conditioner blends with the SWDF material and provides a finer material for flowability. An auger feed, designated generally as 44, is illustrated below feed hopper 38 to convey SWDF material 36 to combustion chamber C. It is to be understood, of course, that other means for feeding the SWDF material to the combustion chamber may be used, such as a ram feed. A chute 46 connects feed hopper 38 to an inlet of auger feed 44. The auger feed includes an auger 50 and a pair of shutoff gates 54 and 56 (FIG. 3). There is a motor drive control 48 which controls the speed of auger 50 by a manual setting representing a percentage or tons per hour. Auger feed 44 includes a compression section 44a where the feed housing 58 tapers toward and terminates at shutoff gate 54. The compression section allows the shredded material to be densified or compressed into a plug 45. From shutoff gate 54 to shutoff gate 56, there is an expansion section 44b which tapers outwardly toward shutoff gate 56 and allows the compressed plug 45 to expand and release so that loose, shredded SWDF material 36a flows freely into combustion chamber C through feed outlet 64. The SWOF material is then combusted by the burner flame 66 from an industrial burner 68 (FIG. 2).

The burner 68 is fueled by a quick reacting control fuel 67, such as conventional coal, oil, gas, liquid waste derived fuel, or mixtures thereof. Burner 68 may be any suitable industrial/commercial burner. The temperature of the burner flame is controlled by the mixture or ratio of the control fuel. The flame initiates combustion of SWDF material at a controlled temperature in a high oxygen environment to produce a generally complete burnout of the wastes. For this purpose, a fuel mixture control 69 is connected in a loop with a thermocouple "T" located at the hot gas exit of the bottom cyclone 14 to regulate the control fuel mixture. In this manner, control fuel 67 is controlled to maintain a desired temperature at thermocouple T, typically 880° C., which generally corresponds to 95% calcination. In the combustion chamber achieving a complete burnout of the SWDF material is desired, as well as a high level of calcination of the raw kiln material. For this purpose, raw kiln material 70 or 66 is gravity fed into the combustion chamber from intermediate cyclone 16 through an inlet pipe 70a. A similar feed may be provided on the opposite side of the burner. Tertiary air 72 from the clinker cooler, having an oxygen content generally that of ambient, enters the combustion chamber on opposing sides through air inlets 74 and 76. The SWDF material is burned in the combustion chamber, along with the raw meal and other combustibles, in the presence of a high or ambient oxygen atmosphere due to the tertiary air. Any non-combustible products or ashes mix with the kiln material in the combustion chamber and flow into the calciner duct to continue any needed further calcinations and become part of the clinker, and eventually cement.

In order to control the temperature in combustion chamber C, it may be necessary to divert part of the raw kiln material directly to in-line calciner duct 22. A split gate valve 63 may be utilized to divert part of the raw kiln meal into the calciner duct, preferably up to 15%. Then, the temperature may be increased in the combustion chamber up to 1200 C as long as the desired temperature at the thermocouple is maintained. The increased heat is used to calcine the kiln material in the combustion chamber. About 50 to 100 percent of the raw kiln material can be fed into the calciner combustion chamber with about 85 to 100 percent being preferred.

The zone of entry of the tertiary air, raw kiln meal, and fuels, which typically occurs in an in-line duct in known calciners, occurs in calciner combustion chamber C in the present invention. In accordance with the present invention, an atmosphere of about 21% oxygen occurs in the combustion chamber whereas the oxygen content at the entry zone of prior calciners has been about 12%. An enriched oxygen atmosphere may also be used in the calciner combustion chamber. The heat and ashes of combustion are introduced via connector duct 28 into the calciner duct above riser duct 71 where they mix with the hot kiln gases flowing through riser duct 71. It will be noted that calciner combustion chamber C is located at a level so that downwardly inclined connector duct 28 flows into the calciner duct just above riser duct 71 and the charge end of the rotary kiln. Calciner B begins above the riser duct and includes calciner combustion chamber C and calciner loop duct D. Because the velocity of the kiln gas increases through the riser duct, the ashes and calcined kiln material are carried upward rather than fall into the kiln.

In operation of the feed system, the auger speed is initially set to feed a desired constant rate of SWDF material in tons per hour. This is done by manually setting the auger motor control 48. The amount of raw kiln meal delivered to the calciner combustion chamber is determined, preferably between 85 to 100 percent, and diverter gate 63 is set to divert the remaining meal directly to in-line calciner duct 22. Preferably, the SWDF material provides about 18 to 20 percent of the fuel needed for calcination. With these two parameters set, quick reacting control fuel 67 is fed to burner 68, and is continuously regulated by the thermocouple loop to maintain a temperature of about 880 C at the beginning of gas exit duct 22b of the preheater connected to bottom cyclone 14. Heat from the SWDF material and flame causes calcination of most of the raw kiln material in the calciner combustion chamber with a generally complete burnout of the combustible materials. Any remaining calcination and burnout is achieved in the calciner duct loop where heat from the kiln gases are added. Complete burnout means the burnout required to meet the regulatory levels of carbon monoxide, total hydrocarbons, and volatile organic compounds.

In the event the SWDF feed system is to be shut down, the following routine is followed. First, auger 50 is operated in a reverse direction to allow the compressed plug to decompress. Next, shutoff gate 54 is closed as soon as decompression of the plug permits. At or near the same time, shutoff gate 56 is shut. Closing of the shutoff gates prevents further combustion of the SWDF material, and prevents smoldering as would allow a fire in the feed hopper. In addition, upon closure of the shutoff gates, waste fuel conditioner 42 from bin 40 is dumped on top of SWDF material 36 in the feed hopper 38 to further seal off the SWDF material in the feed hopper from air. This also prevents further fire starting in the feed hopper. A control valve 82 is provided to control the dispensing of waste fuel conditioner into feed hopper 38. For example, in an emergency shutdown condition, the fuel conditioner may be dumped fairly quickly into the fuel hopper to smother out any impending fire threat. In other instances, it may be desirable to have a controlled, slow feed or intermittent feed of fuel conditioner from the bin to the feed hopper. The control of control valve 82 and shutoff gates 54 and 56 may be had using a programmed logic controller 83 or a computer machine.

Referring now to FIG. 5, a solid waste fuel conveyor E is illustrated which is enclosed in an airtight housing 90 filled with nitrogen as an inert gas 84 to eliminate any fire or combustion dangers. Conveyor E is designed to carry SWDF fuel in any form such as loose material, containerized material, bales of material, or other package forms. In any case, no matter the form of the fuel as it is fed into hopper 38, the material, and any container or package, is shredded and compacted by the auger 44, so it is fed in a continuous manner to the combustion chamber.

As illustrated in FIG. 5, loose shredded SWDF material 36 is placed into a hopper 92 and deposited onto a conveyor belt 94 of conveyor E. As stated previously, the SWDF material has been pre-conditioned by shredding to achieve a desired particle size prior to being placed in hopper 92. In addition, packaged, baled, or other containerized forms of shredded solid waste fuel may be deposited onto conveyor belt 94 by means of a second conveyor feed system (not shown).

Finally, to control the amount of solid waste delivered to hopper 38, there is a conveyor control system designated generally as 98 which includes a programmed logic controller 100 and a variable speed drive 102 which drives the drive roller 95 of belt conveyor 94. A belt scale 104 measures the flow of material on belt conveyor 94 in terms of tons per hour. This measured value is compared to preset value in controller 100. If the measured value is less, the belt conveyor is speeded up, if the measured value is greater than the preset value, the belt conveyor is slowed so that a constant feed rate is supplied to hopper 38. This maintains a desired constant head of material above auger 50.

Figure 6:
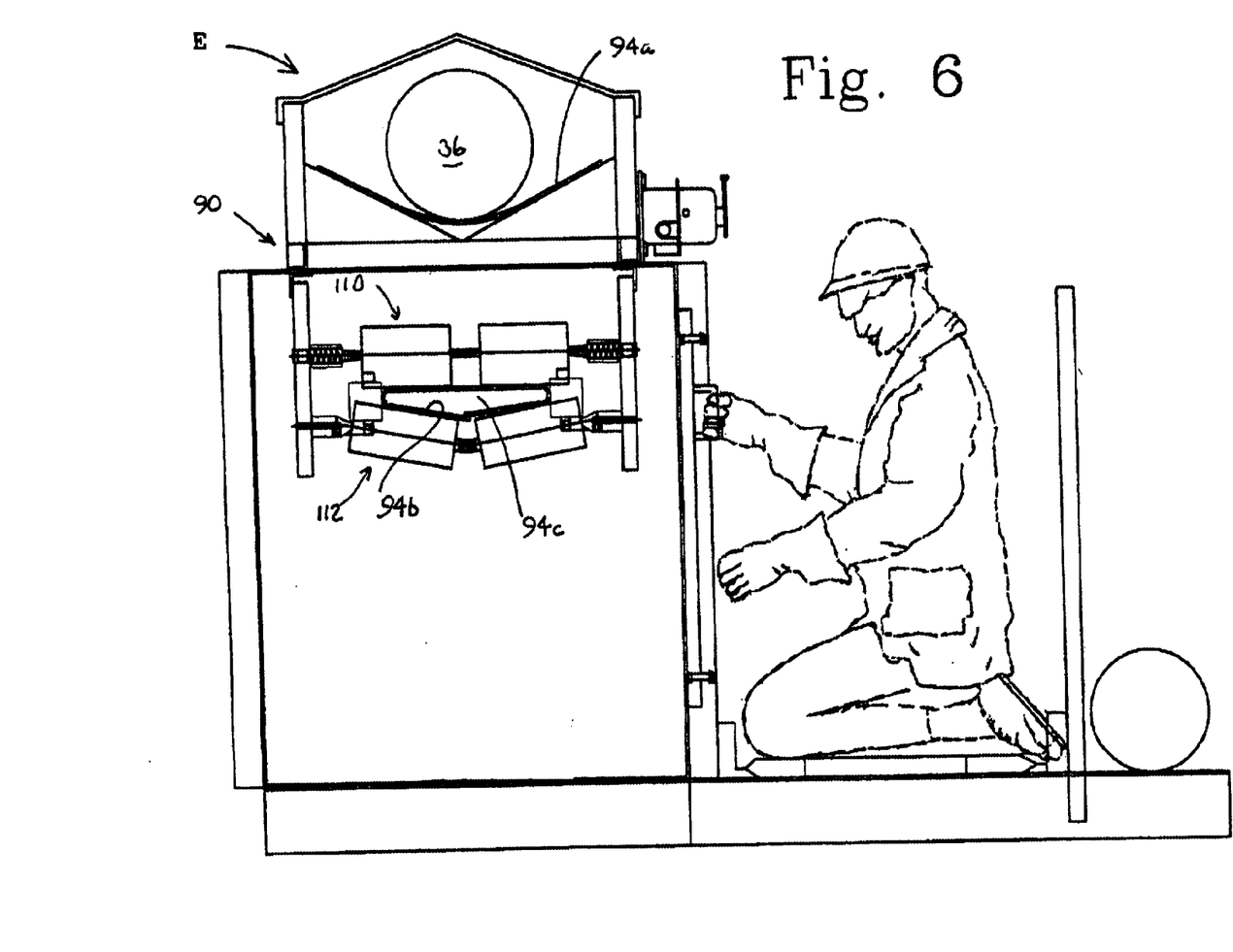
FIG. 6 is a front section view of a feed conveyor which encloses upon itself in a return path to minimize the collection of debris on the conveyor housing floor according to the invention.

As can best be seen in FIG. 6, conveyor 94 includes an air belt having a top run 94a which is generally trough shaped that conveys shredded solid waste material represented by 36 to the feed hopper 38 of auger feed system 44 in the presence of nitrogen oxide instead of air. On the return run 94b of the trough, the conveyor belt is folded upon itself to form an enclosure 94c for containing any residual SWDF material that is not dumped from the conveyor. In this manner, dropping of the residual material onto the floor of the housing is prevented. This prevents the build up of residual material in the housing as may be likely to cause combustion. For this purpose, upper and lower sets of folding rollers 110 and 112 are provided to fold the conveyor belt along the return run. In addition, housing 90 is filled with an inert gas to further prevent combustion, as described above.

Thus, it can be seen that an advantageous system and method for feeding and burning SWDF in a calciner of a kiln can be had according to the invention. SWDF material is burned most efficiently for calcinations of the raw kiln material fed into the calciner combustion chamber. Further burnout of waste and/or calcinations of kiln material is achieved in the calciner duct where heat from kiln gases is added.

While a preferred embodiment of the invention has been described using specific terms, such description is for illustrative purposes only, and it is to be understood that changes and variations may be made without departing from the spirit or scope of the following claims.

What is claimed is:

1. A calciner kiln for producing cement from raw kiln material comprising:

a preheater having a plurality of cyclone stages for heating said raw kiln material;

a calciner having a calciner combustion chamber and a calciner loop duct for calcining the raw kiln material;

an in-line calciner duct in included in said loop duct;

a rotary cement kiln having a charge end and a discharge end for producing clinker from the calcined raw kiln material;

a riser duct disposed between said in-line calciner duct and said charge end of said rotary kiln so that said riser duct and in-line calciner duct are in-line with a flow of hot kiln gas from said charge end of said rotary kiln;

a raw kiln material feed for feeding raw kiln material into said combustion chamber;

a waste material feed system for continuously feeding solid waste derived fuel (SWDF) material into said combustion chamber;

said calciner combustion chamber having a controlled environment for burning said SWDF in the presence of the raw kiln material for calcining the raw kiln material;

a connector duct connecting said calciner combustion chamber and calciner duct for delivering the calcined kiln material, heat of combustion, and any ashes of non-combustible material to said in-line calciner duct at an entry zone above said riser duct.

2. The apparatus of claim 1 including a clinker cooler connected to the discharge end of said rotary kiln for cooling clinker produced in said rotary kiln using air passing through the clinker cooler; and at least one air inlet connected to said combustion chamber in communication with said clinker cooler delivering tertiary air to said combustion chamber from said clinker cooler for use as combustion air having an oxygen content generally equal to that of ambient air.

3. The apparatus of claim 1 wherein said combustion chamber includes a burner producing a burner flame to control the temperature in said calciner combustion chamber and combustion of said SWDF material.

4. The apparatus of claim 3 including an air inlet for introducing combustion air into said combustion chamber having a high oxygen content generally equal to or greater than that of ambient.

5. The apparatus of claim 3 including a fuel control regulating the feed of a control fuel to said burner; said control fuel providing a more spontaneous combustion than said SWDF material to provide a more effective control over the temperature in said calciner combustion chamber.

6. The apparatus of claim 1 wherein said preheater includes an intermediary cyclone stage for collecting the raw kiln material, and said raw kiln material feed supplies said raw kiln material to a feed inlet of said combustion chamber; and said preheater including a bottom separation cyclone for collecting calcined raw material and feeding the calcined raw material to said rotary kiln.

7. The apparatus of claim 6 including a control element for splitting the feed of raw kiln material between said calciner combustion chamber and in-line calciner duct.

8. The apparatus of claim 6 wherein said waste material feed system includes a feed control for feeding said SWDF material to said calciner combustion chamber at a controlled amount.

9. The apparatus of claim 1 wherein said waste feed system for feeding SWDF material to said combustion chamber includes a feed hopper for accumulating said SWDF material in a shredded form, and a auger feed for feeding said SWDF material from said hopper to said combustion chamber.

10. The apparatus of claim 9 wherein said auger feed includes a compression section and an expansion section wherein a compressed plug of said shredded SWDF material is produced in said compression section and is fed to said expansion section for feeding into said combustion chamber through an auger feed outlet.

11. The apparatus of claim 10 wherein said compressed plug of SWDF material expands in said expansion section of said auger feed and falls generally freely through said outlet by gravity into said combustion chamber as loose shredded material.

12. The apparatus of claim 11 including a first shutoff gate disposed between said compression section and said expansion section of said auger feed; and a second shutoff gate disposed near said auger feed outlet, said shutoff gates being operable to open and close the feed of SWFD material through said auger feed.

13. The apparatus of claim 12 wherein said first shutoff gate has an open position to allow feed of SWDF material through said auger feed and a closed position to block the feed of SWDF material to said expansion section; and said second shutoff gate has an open position to allow feed of SWDF material to said auger feed outlet and a closed position to block the feed of SWDF material to said auger feed outlet; and a controller for controlling the open and closed positions of said first and second shutoff gates.

14. The apparatus of claim 13 wherein said controller positions said first and second shutoff gates in their closed positions in response to a controller input to shut down the SWDF feed system so that hot combustion gas and fire from the combustion chamber are not allowed to flow backward through the feed system.

15. The apparatus of claim 14 wherein said controller operates said auger in a reverse operation prior to moving said first and second shutoff gates to said closed positions to release the compression of said compressed plug in said compression section of said auger feed.

16. The apparatus of claim 9 including a feed conveyor for feeding the SWDF material to said auger feed hopper.

17. The apparatus of claim 16 including an enclosure enclosing said feed conveyor; and including means filling said enclosure with an inert gas to prevent combustion of said conveyer SWDF material.

18. The apparatus of claim 17 including a conveyor controller for controlling the feed rate of SWDF material to said feed hopper so that a desired fill of SWDF material is maintained in said feed hopper.

19. The apparatus of claim 17 wherein said conveyor includes an upper air belt conveyance run wherein said conveyor belt is open for conveying loose shredded waste material for delivery, and a closed lower run in which opposing edges are folded to form a belt enclosure wherein any residual loose material is prevented from falling into the housing.

20. The apparatus of claim 9 including a fuel conditioner bin for containing fuel conditioner; and a bin outlet for feeding said fuel conditioner to said feed hopper of said auger feed to mix with said SWDF material enhancing the flowability of said SWDF material.

21. The apparatus of claim 20 including a bin control valve disposed in the outlet feed of said fuel conditioner bin to control the flow of fuel conditioner into said feed hopper of said feed system.

22. The apparatus of claim 21 including a controller for controlling the control valve of said fuel conditioner bin feeder; and said controller controlling said control valve upon receipt of a signal to close down said combustion chamber to apply sufficient amount of fuel conditioner to cover the top of said SWDF material in said hopper feeder to prevent combustion air from entering the hopper.

23. In a calciner kiln for producing cement from raw kiln material including a preheater for heating said raw kiln material; a calciner for thermally decomposing said raw material; a rotary cement kiln for producing clinker having a charge end and a discharge end; said calciner being in communication with said charge end of said rotary kiln for receiving hot kiln gas from said kiln; and a clinker cooler connected to said discharge end of said rotary kiln for cooling clinker falling into said clinker; a system for continuously feeding and burning solid waste derived fuel (SWDF) material in the calciner comprising:

a calciner combustion chamber;

a kiln feed for feeding raw kiln material to said calciner combustion chamber;

a waste material feed system for continuously feeding SWDF material at a controlled rate to said calcine combustion chamber for burning;

a burner for producing a flame in said calciner combustion chamber having a burner fuel control for feeding a control fuel to the burner to control the temperature in said combustion chamber; and said calciner combustion chamber having a high oxygen, controlled temperature environment for burning SWDF material and control fuel to a generally complete burnout for calcining said raw kiln material.

24. The apparatus of claim 23 including a riser duct connected between said charge end of said rotary kiln and said calciner, said combustion chamber introducing hot combustion gas generally above said riser duct for mixing with the hot kiln gas flowing through the riser duct at a high velocity for further calcining of the raw kiln materials and burnout of the SWDF material.

25. The apparatus of claim 23 including a feed hopper included in said waste feed system for accumulating shredded SWDF material, and a force feeder for feeding said shredded SWDF material from said hopper to said combustion chamber; and a feed conveyor for conveying said SWDF material to said feed hopper in a shredded form.

26. The apparatus of claim 25 wherein said force feeder includes an auger feed having a compression section and an expansion section wherein a plug of said SWDF material is compressed in said compression section and is released in said expansion section for feeding into said combustion chamber to fall freely as loose shredded material through a feed outlet into said combustion chamber.

27. The apparatus of claim 26 including a first shutoff gate disposed between said compression section and said expansion section of said auger feed; and a second shutoff gate disposed near said feed outlet of said auger feed, said shutoff gates being operable to open and close the feed of SWFD material through said auger feed.

28. The apparatus of claim 27 wherein said first shutoff gate has an open position to allow feed of SWDF material through said auger feed and a closed position to block the feed of SWDF material to said expansion section; and said second shutoff gate has an open position to allow feed of SWDF material to said auger feed outlet and a closed position to block the feed of SWDF material to said auger feed outlet; and a controller for controlling the open and closed positions of said first and second shutoff gates.

29. The apparatus of claim 28 wherein said controller positions said first and second shutoff gates in their closed positions in response to a controller input to shut down the SWDF feed system so that hot combustion gas and fire from the combustion chamber are not allowed to flow backward through the feed system, and said controller operates said auger in a reverse operation prior to moving said first and second shutoff gates to said closed positions to release the compression of said compressed plug.

30. The apparatus of claim 29 including a fuel conditioner bin for containing fuel conditioner; and a bin outlet for feeding said fuel conditioner into said hopper of said feed system for mixing with said SWDF material to enhance its flowability.

31. The apparatus of claim 30 including a control valve disposed in the outlet feed of said fuel conditioner bin to control the flow of fuel conditioner into said feed hopper of said feed system; and said controller controlling the control valve of said fuel conditioner bin feeder upon receipt of a controller input to close down said combustion chamber to apply a sufficient amount of fuel conditioner to cover the top of said SWDF material in said hopper feeder to prevent combustion air from entering the hopper.

32. In a calciner kiln having a preheater for preheating raw kiln material, a calciner for calcining the raw kiln material and a rotary kiln for burning the calcined raw cement material to produce clinker which is eventually cooled in a clinker cooler, said rotary kiln having a charge end and a discharge end, and a riser duct connecting said calciner and the charge end of said rotary kiln for receiving hot kiln gas flowing from said charge end, a calciner and waste material feed system for continuously burning solid waste derived fuel (SWDF) material in said calciner to fuel at least part of the calcination process comprising:

a calciner having a calciner duct with an in-line calciner duct in an in-line flow relationship with hot kiln gases flowing through said riser duct at a high velocity;

an air inlet for introducing combustion air into said calciner having an oxygen content generally equal to ambient;

a raw material inlet for introducing raw kiln material into said calciner;

a SWDF material feed system for introducing SWDF material into said calciner;

said SWDF material being burned in said calciner in the presence of said raw kiln material to facilitate calcination of the kiln material with the heat and by-products of burning and said calcined kiln material being introduced into the high velocity hot kiln gas flow in a zone generally above said riser duct;

whereby said SWDF material and calcined kiln material continue any necessary burnout and calcination in said calciner duct.

33. The apparatus of claim 32 wherein said calciner includes a calciner combustion chamber where the burning of said SWDF material is initiated by a burner flame produced by a control fuel in the presence of said raw kiln material whereby said SWDF material and said control flame produce calcination heat at a controlled temperature; and a connector duct connecting said calciner combustion chamber to said in-line calciner duct at said zone whereby hot combustion gas from said combustion chamber is added to said hot kiln gas to achieve a complete burnout of the SWDF material and complete calcination of the raw kiln material.

34. The apparatus of claim 32 wherein said SWDF feed system includes a feed conveyor for conveying loose shredded SWDF material to a feed hopper, said shredded SWDF material being fed from said feed hopper into said calciner.

35. The apparatus of claim 34 including a housing enclosing said feed conveyor; and including means maintaining an inert gas atmosphere within said enclosure to prevent combustion of said conveyer SWDF material.

36. The apparatus of claim 35 wherein said conveyor includes an upper conveyance run wherein said conveyor belt is open for conveying loose shredded waste material for delivery, and a closed lower run in which opposing edges are folded to form a belt enclosure wherein any residual loose material is prevented from falling into the housing.

37. The apparatus of claim 34 including a conveyor controller for controlling the feed rate of SWDF material to said feed hopper so that a desired fill of SWDF material is maintained in said feed hopper.

38. The apparatus of claim 34 including a fuel conditioner bin for feeding fuel conditioner into said feed hopper to improve the flow ability and dryness condition of said shredded SWDF material.

39. A method for feeding and burning solid waste derived fuel (SWDF) material for the calcination of raw kiln material in the manufacture of cement clinker, which clinker is manufactured by a process by which raw kiln material is preheated in a preheater, calcined in a calciner, burned into clinker in a rotary kiln, where after the clinker is eventually cooled in a cooler. Said method for feeding and burning the SWDF material during the calcining process comprises:

introducing the SWDF material into a calciner having a combustion chamber;

introducing the raw kiln material into the combustion chamber;

burning the SWDF material in the combustion chamber in a high oxygen atmosphere at a controlled temperature to achieve a generally complete combustion and calcination of said raw kiln material;

feeding the combustion gas from the combustion chamber and the calcined raw meal into an in-line duct of the calciner wherein the combustion gas mixes with hot kiln gas flowing from the rotary kiln so that the heat from combustion chamber gas and hot kiln gas complete any necessary combustion of SWDF material and calcination of raw kiln material.

40. The method of claim 39 including feeding the SWDF material in a shredded form to a feed hopper, feeding the SWDF material from the feed hopper to a feed outlet at a controlled rate so that loose shredded SWDF material is distributed into the combustion chamber.

41. The method of claim 39 including feeding the SWDF material to a feed hopper in the form of shredded material, feeding the SWDF material from the feed hopper to an auger feed having a compression section and an expansion section; and compressing the SWDF material to form a compressed plug in the compression section; and releasing the compressed plug of SWDF material in the expansion section so that the SWDF material in the form of loose shredded material falls through an auger feed outlet into the combustion chamber.

42. The method of claim 41 including controlling the flow of SWDF material through said auger feed by placing a first shutoff gate at an end of said compression section and placing a second shutoff gate near said feed outlet so that said first and second shutoff gates can be closed to block the flow of hot gases and fire from the combustion chamber into the feed hopper during shut down of the combustion chamber.

43. The method of claim 42 including providing a fuel conditioner bin containing fuel conditioner which is mixed with said SWDF material in said feed hopper to increase the flowability of said SWDF material.

44. The method of claim 43 controlling the feed of fuel conditioner to the feed hopper to mix with said SWDF material including controlling the feed of fuel conditioner to the feed hopper during shut down of the combustion chamber to smother the SWDF material in the feed hopper to prevent combustion.

45. The method of claim 39 including conveying said SWDF material to said feed hopper; controlling the feed rate of said SWDF material on the conveyor, and controlling the feed rate to maintain a prescribed fill of SWDF material in the feed hopper during operation of the combustion chamber.

46. The method of claim 45 including enclosing the conveyor in an inert gas environment so that combustion of the SWDF material is prevented during conveyance.

47. The method of claim 46 including using a conveyor belt having an open configuration for conveying the material on an upper run, and a closed configuration retaining any residual material on a return run of said conveyor belt.

48. The method of claim 39 including feeding raw kiln material into the combustion chamber by collecting said raw kiln material in an intermediate stage cyclone and feeding the collected raw kiln material to the combustion chamber directly.

49. The method of claim 39 including introducing tertiary air from the clinker cooler into the combustion chamber to provide an ambient high oxygen atmosphere in said calciner combustion chamber for combustion.

* * * * *